Jan. 19, 1960   R. L. JAESCHKE   2,922,056
ELECTRIC DYNAMOMETER OR BRAKE
Filed Sept. 20, 1957   4 Sheets-Sheet 1

FIG. I.

Ralph L. Jaeschke,
Inventor.
Koenig and Pope,
Attorneys.

Jan. 19, 1960   R. L. JAESCHKE   2,922,056
ELECTRIC DYNAMOMETER OR BRAKE
Filed Sept. 20, 1957   4 Sheets-Sheet 2

Ralph L. Jaeschke
Inventor.
Koenig and Pope
Attorneys.

Jan. 19, 1960 R. L. JAESCHKE 2,922,056
ELECTRIC DYNAMOMETER OR BRAKE
Filed Sept. 20, 1957 4 Sheets-Sheet 3

Ralph L. Jaeschke
Inventor
Koenig and Pope,
Attorneys.

Jan. 19, 1960 R. L. JAESCHKE 2,922,056
ELECTRIC DYNAMOMETER OR BRAKE
Filed Sept. 20, 1957 4 Sheets-Sheet 4
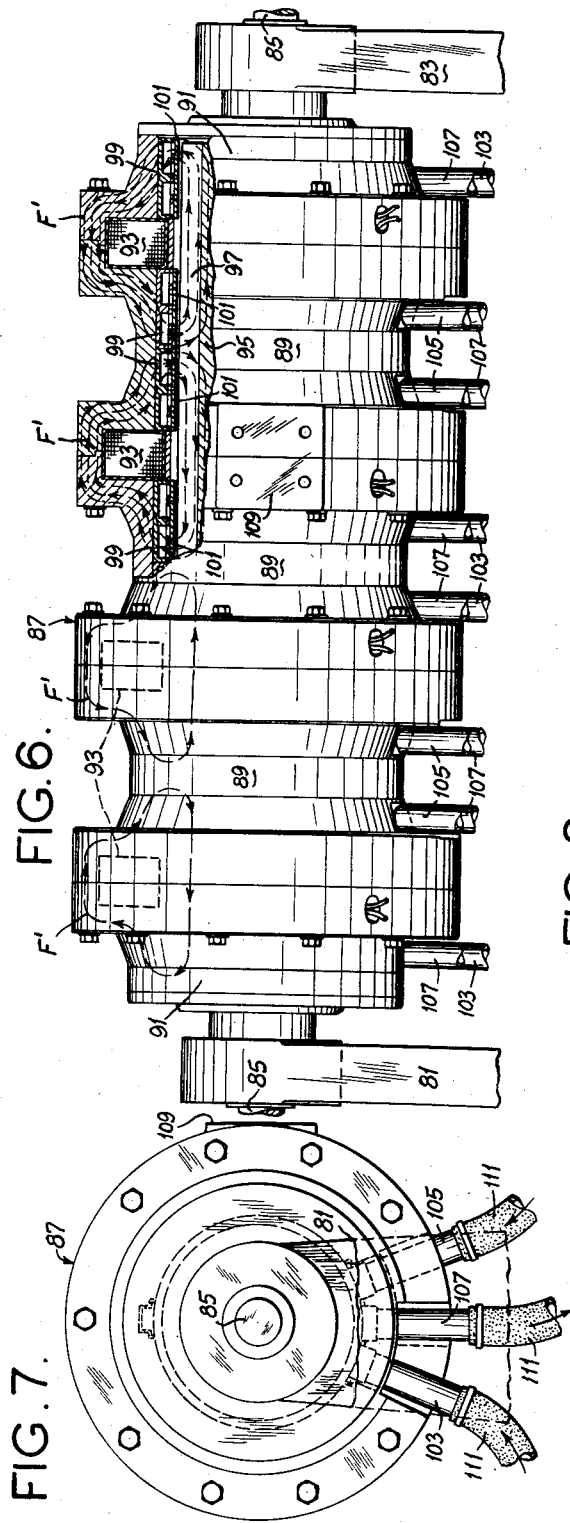
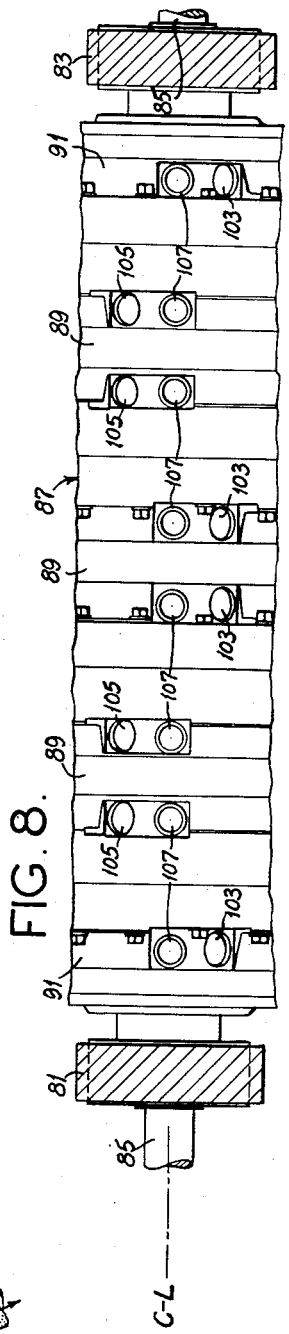
Ralph L. Jaeschke,
Inventor.
Koenig and Pope,
Attorneys.

United States Patent Office 2,922,056
Patented Jan. 19, 1960

2,922,056

ELECTRIC DYNAMOMETER OR BRAKE

Ralph L. Jaeschke, Kenosha, Wis., assignor to Eaton Manufacturing Company, Cleveland, Ohio, a corporation of Ohio Application September 20, 1957, Serial No. 685,323

7 Claims. (Cl. 310—93)

This invention relates to electric dynamometers or brakes, and with regard to certain more specific features, to liquid-cooled eddy-current dynamometers or brakes of the so-called dry gap type, being an improvement upon constructions such as shown in U.S. Patents 2,106,542 and 2,220,032.

Among the several objects of the invention may be noted the provision of a dry gap liquid-cooled dynamometer or brake capable of extremely high energy absorption at very high speeds of rotation; the provision of a dynamometer or brake of the class described, wherein the eddy-current inductor member is constructed to avoid high temperature gradients in the walls between the dry gap and the coolant, such as might otherwise induce undesirably large distortions, leakage and even cracking; the provision of a dynamometer which will operate under heavy loads with a minimum of oscillations of its stator so that steady scale readings may be obtained; and the provision of dynamometers or brakes of the class described which are of low-cost construction and which require a minimum of maintenance. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is an axial section of a single-unit form of the invention;

Fig. 6 is a side elevation of a compound embodiment of the machine illustrated in Fig. 1, parts being in section;

Fig. 7 is a left end view of Fig. 6;

Fig. 8 is a fragmentary bottom plan view of Fig. 6;

Corresponding reference characters indicate corresponding parts throughout the several views of the drawings.

Figure 1:
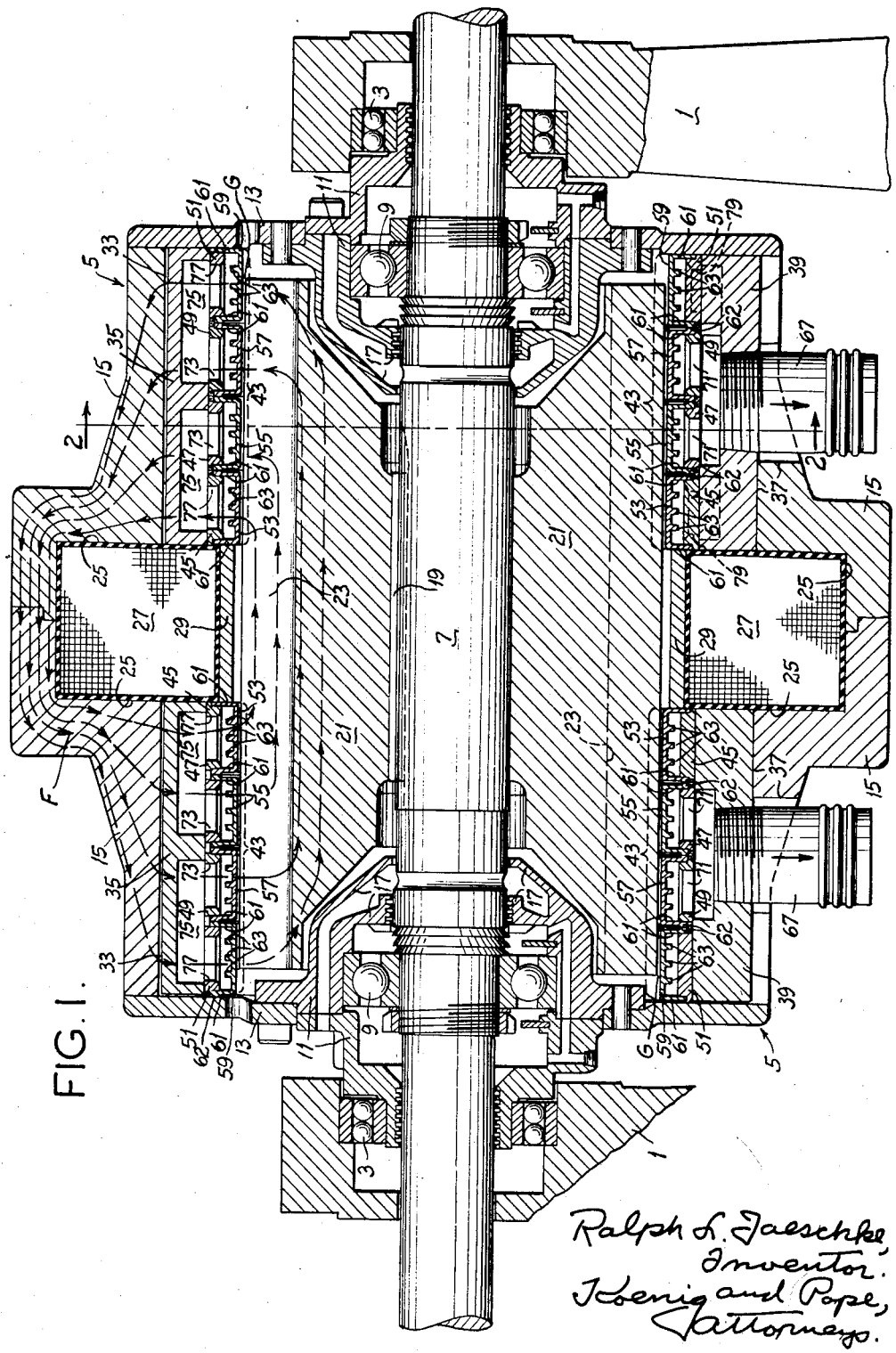
Figure 2:
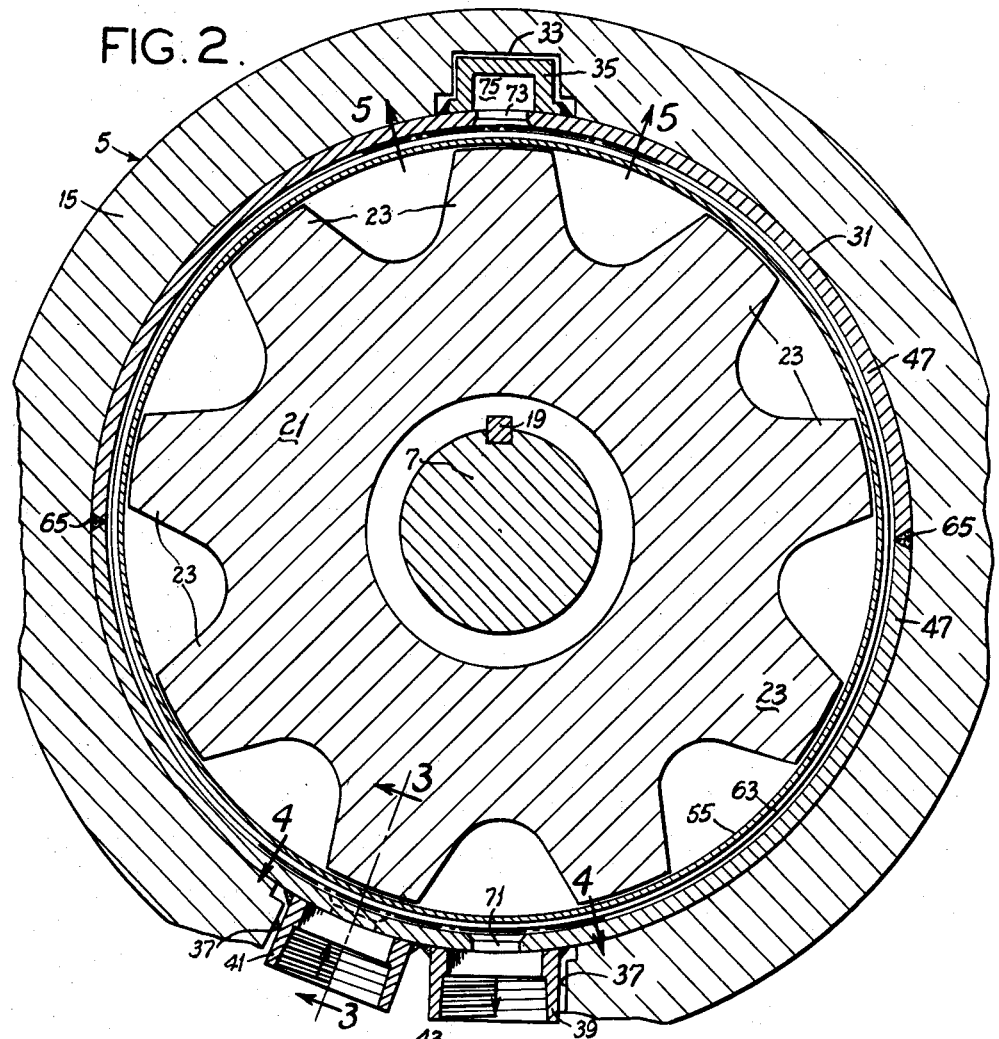
Fig. 2 is an enlarged cross section taken on line 2—2 of Fig. 1.

Generally speaking, there are two types of liquid-cooled eddy-current dynamometers, namely (1) the so-called wet gap type in which the coolant is introduced directly into the magentic gap of the machine and (2) the so-called dry gap machine in which the coolant is isolated from the gap and located in passages in the inductor member. The first type has the advantage of minimizing temperature gradients in the inductor material at the gap, whereas the second type has the advantage of avoiding hydraulic drag between the rotor and the inductor of the machine, which under certain circumstances may cause unsteady operating conditions. These unsteady conditions can be more easily controlled at low operating speeds and therefore the wet gap type of machine has been found satisfactory at such speeds.

In the case of extremely high-speed, high-capacity machines, for example absorbing 3,000 H.P. at 25,000 r.p.m., for gas turbine and like testing purposes, the dry gap type of machine is preferred, because of its steady operating characteristics although ordinarily involving the distortion, leakage and cracking problems brought about by the high temperature gradients in the cooling walls between the magnetic gap and the liquid passages.

In said Patent 2,220,032, certain suggestions are made for avoiding the difficulties above discussed by the use of grooved inductor rings forming cooling channels, but these are not applicable under some present-day speed and capacity requirements. This is because the former inductor rings were made sufficiently heavy to accommodate all of the magnetic flux required for the energy to be absorbed. These thicknesses were determined by the quantity of magnetic flux necessary to develop the required torque. Thus, in effect, the thermal efficiency was dictated by the magnetic design requirements. As a result, approximately ½ H.P. energy absorption per square inch of inductor surface was never exceeded.

On the contrary, very high-speed machines (up to 35,000 r.p.m. or so) have their designs dictated by the centrifugal bursting stresses which control the rotor diameter, and by bending in response to critical vibrations of the rotor. In other words, in designing these machines, first consideration must be given to the rotor size in view of strength limitations, rather than to torque and thermal capacity.

Adequate torque capacity with high-speed small rotors is not difficult to obtain as dynamometers are rated on a horsepower basis, horsepower being the product of torque and speed; thus $$H.P. = \left(\frac{\text{torque} \times \text{r.p.m.}}{5250}\right)$$

As this invention relates particularly to high-speed machines, the torque values are relatively low and energy values are relatively high. However, this fact will not avoid a high temperature gradient in the inductor rings. By means of the present invention, at speeds of 15,000 r.p.m. or more, 2.5 H.P. absorption per square inch of inductor surface may be obtained with lower temperature gradients than were obtained under the stated ½ H.P. absorption per square inch in former constructions.

Referring now more particularly to Figs. 1–5, pedestals are shown at numeral 1, carrying bearings 3 for supporting the stator, which is a rocking casing 5 in the case of a dynamometer application of the invention. Although the casing 5 rocks, it is generally referred to as a stator because it does not rotate more than a few degrees, being, as is known, prevented from freely rotating by the usual arm attached thereto which bears on a scale (not shown). This rocking action should be steady and not oscillatory under operating conditions, which makes the dry gap type of machine preferable, as above outlined. In the case of a pure break application the stator would be fixed.

At 7 is shown a dynamometer shaft to which is attached the equipment to be tested, such as, for example, a high-speed gas turbine. This shaft is supported upon bearings 9 in hubs 11. The hubs 11 support nonmagnetic end plates 13, which in turn support ferromagnetic (for example, steel) joined housing rings 15. At 17 are provided suitable protective shields for the bearings 9.

Keyed as at 19 to the shaft 7 is a ferromagnetic (steel, for example) rotor 21, having axially disposed pole-forming teeth 23. Rings 15 are provided with seats 25 for an annular field coil 27, within which is a nonmagnetic ring 29. The coil 27 may be water cooled, as will appear below. The rings 15 are provided with inside cylinder-forming walls 31, recessed at the top as shown at 33 for accepting certain axially extending liquid transfer boxes 35, to be described. The rings 15 are also recessed at the bottom, as shown at 37, for accepting certain water outlet boxes or manifolds 39 and certain water inlet boxes or manifolds 41 (see also Figs. 2 and 3).

The cylindrical inside walls 31 are adapted to receive on opposite sides of the coil 27 inductor and cooling ring assemblies, indicated generally within bracket lines indexed 43. Each assembly 43 carries its respective boxes 35, 39 and 41 and is constituted by one or more (four, for example) pairs of relatively thick circular rings 45, 47, 49 and 51 (see Fig. 3 for details) composed of ferromagnetic material such as steel. Each set of rings 45, 47, 49 and 51 surrounds much thinner and flexible rings 53, 55, 57 and 59, respectively. These rings are preferably forged. Each ring 53, 55, 57 and 59 has endwise relatively long outwardly directed supporting collars or ribs 61 and relatively short outwardly directed heat-dissipating ribs 63 therebetween. The pairs of semicircular rings 45, 47, 49, 51 are externally applied to the rings 53, 55, 57, 59, respectively, and welded as shown at 65, the remaining surfaces therebetween being preferably brazed or otherwise made watertight. The outer margins of the supporting ribs have axial flanges 62 adapted to space the ribs 61 where they are adjacent, so as to permit relative flexing between them.

The four assemblies of rings (45, 53), (47, 55), (49, 57) and (51, 59) are assembled with one another and with the boxes 35, 39 and 41 and brazed or otherwise joined to form the units 43, which are placed within the rings 15 prior to bolting the end plates 13 on the latter. The lower outlet boxes 39 are provided with suitable water outlet nipples 67 to which suitable flexible hoses are attached (not shown on Figs. 1–5). The boxes 41 are provided with suitable inlet nipples 69 to which flexible hoses are attached (also not shown on Figs. 1–5).

Figure 3:
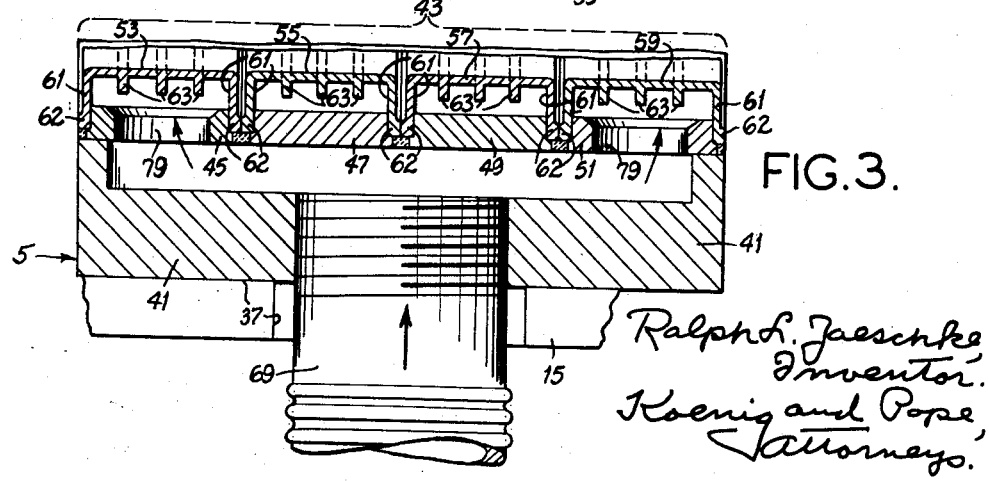
Fig. 3 is a further enlarged fragmentary axial section taken on line 3—3 of Fig. 2.
Figure 4:
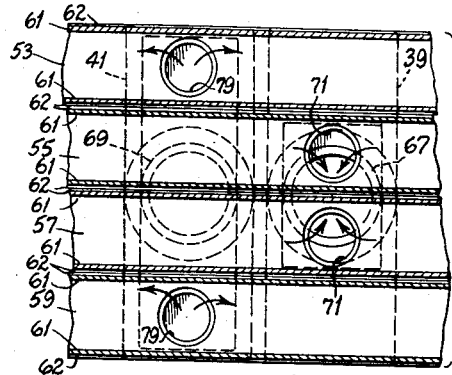
Fig. 4 is a fragmentary inside plan view developed from line 4—4 on Fig. 2.
Figure 5:
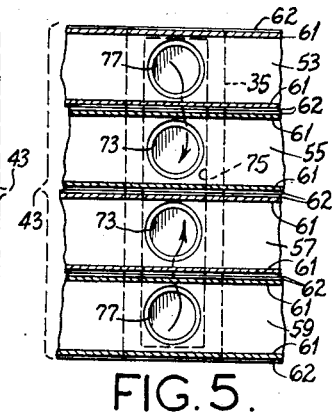
Fig. 5 is a fragmentary plan view developed from line 5—5 of Fig. 2.

The rings 47 and 49 are provided with bottom outlet ports 71, communicating with the outlet boxes 39 (Fig. 1). These rings also have top inlet ports 73, which communicate with the insides 75 of upper boxes 35. The rings 45 and 51 have top outlet ports 77, respectively communicating with upper boxes 35. These rings also have bottom inlet ports 79 (Fig. 3). These communicate with the inlet boxes or manifolds 41.

Water under pressure is supplied from flexible hoses on the inlets 69 and enters the rings 45 and 51 through bottom inlet ports 79. The flow through the water passages between the pairs of rings 45, 53 and 51, 59 divides and rejoins for escape at the top outlet ports 77. The spaces 75 direct the water oppositely and transversely to the top inlet ports 73 of rings 47 and 49 and it descends with divided flow through the water passages formed between the pairs of rings 47, 55 and 49, 57 for escape through the bottom outlets 71, outlet boxes 39 and outlets 67 to flexible hoses attached thereto. Thus a flow of heat-absorbing coolant is evenly distributed through the water passages behind the relatively thin, ductile and flexible rings 53, 55, 57 and 59. These rings are preferably composed of ferromagnetic material, although they may be composed of copper, depending upon circumstances to be discussed.

The coil 27 is connected by known means into an electric circuit and when excited produces a surrounding toroidal magnetic field F, several lines of which by way of example are shown by dashes. This field F interlinks the stator 5 and rotor 21, passing on each side of the coil 27 through the rings 15 and 45–59 and teeth 23, as shown. The teeth 23 peripherally polarize this field where it crosses the small gap G between the tooth ends and inner faces of the rings 53–59. This gap G, which is like the ones usually provided, may be on the order of 1/64 to 3/64 inch or so. The total gap to be considered, however, includes the distances jumped by the field between the insides of rings 45, 47, 49, 51 and 53, 55, 57, 59, respectively, each of these being on the order of 1/4 inch or more. For the high capacity expected, this field F is made very strong, provided by a large number of ampere turns in the coil 27, for example on the order of 42,800 ampere turns to provide a field strength of 100,000 lines per square inch of flux density through the much larger than usual magnetic gaps required by the invention.

When a machine to be tested is caused to rotate the shaft 7 and rotor 21, strong eddy currents arise in the rings 53–59 due to the sweep of flux concentrations through the latter. These eddy currents cause countermagnetic fields which react with the polarized field to apply torque from the rotor 21 to the stator 5. Since the stator rocks and carries an arm extending to the measuring scale, the force component of the torque may be measured and horsepower calculated when the length of the torque arm and speed of the rotor are known.

Examples of the ratios of thicknesses of the outer rings 45–51 to the inner rings 53–59 is, for example, 1/4 inch for the former and 1/16 inch for the latter, that is, a ratio of 4:1, with a 1/4 inch radial space therebetween. Thus the inner rings are relatively thin. Moreover, they are made of a ductile material, such as forged steel, if a relatively high resistance to eddy currents is desired, or of copper if a low resistance to eddy currents is desired. This thinness and ductility of the inner rings 53–59 minimize the temperature gradient through them, increase their flexibility without a tendency to cracking in response to distortion, and minimize leakage. Since the spaced radial supporting ribs 61 and 63 of the inner rings 53–59 are also thin and ductile, they contribute to the stated advantages. The intermediate ribs 63 aid in transmitting heat to the water circulating in the passages between rings.

In former machines of the type shown in Patents 2,106,542 and 2,220,032, the cross sections of the inner inductor surfaces, and of supporting sides of the water passages, were sufficiently large that all of the flux field was accommodated by them. This is not true of the inner cylindric surfaces or of the supporting ribs 61 of the rings 53, 55, 57 and 59 used herein. These sections are small enough and the ampere turns of the coil 21 large enough that the magnetic flux in the sections exceeds saturation if these sections are ferromagnetic and is therefore forced across the water-filled radial gaps within the combinations of rings (45, 53), (47, 55), (49, 57) and (51, 59) respectively. While this requires a coil of a large number of ampere turns, a less steep temperature gradient occurs through the rings 53–59. If said sections are not ferromagnetic, the magnetic flux also is in the same way forced across the water-filled radial gaps.

In Figs. 6, 7 and 8 is shown a modification in which structures such as shown in Figs. 1–5 are compounded, so that for a given capacity the diameter of the machine may be reduced while extending its length. Such an arrangement is useful for maximum increase in capacity at maximum increase in speed. In this case the pedestals are shown at 81 and 83, the drive shaft at 85 and the rocking stator casing at 87. In this form of the invention, there are three intermediate twin housing rings 89 and two end housing rings 91, joined as shown to contain four exciting coils 93, two of which are shown in partial section. The rotor is indicated at 95 and its polarizing teeth at 97. In this case the rotor may be of very small diameter, to reduce stresses due to centrifugal force. It is made as long as possible without introducing the danger of critical vibrations in response to the high speed. The fluid-circulating inductor ring assemblies are the same as those already described in connection with Fig. 1.

The scale of Fig. 7 is insufficient to show the details of the ring assemblies, which are the same as the details of the rings shown in Fig. 1. For purposes of identification, the upper transfer boxes are numbered 99, in association with each of which are inductor and cooling ring assemblies, indexed 101 and corresponding to the ring assemblies indexed 43 in Fig. 1.

The toroidal fields generated by the coils 93 are suggested by the dotted lines F'. Their directions are indicated by the arrowheads, the coils 93 being connected into the voltage-supplying circuit for opposite current flows in the adjacent coils to bring about this result. Thus the adjacent portions of the flux in the toroidal flux fields do not cancel one another. Porting and water circulation are accomplished in the manner already described in connection with Figs. 1–3, and as will be clear from Figs. 6, 7 and 8. The inlet ports are shown at 103 and 105. In this case all outlet ports are indicated by the numeral 107 and are located on the bottom of the machine in the plane of its center line CL. In order to counterbalance the effects of the offset relationship of the inlet ports 103 and 105, four of them (103) are placed on one side over the center line CL and four of them (105) are placed on the other side over this center line. The circulation between each inlet port 103 or 105 and its adjacent outlet port 107 will be clear from what has already been said in respect to the circulation in connection with Fig. 1.

In Fig. 7 is shown a typical form of pad to which is bolted the required torque arm reaching to the measuring scales. Numeral 111 suggests typical flexible hose connectors of the type that may be used.

In view of what has been said above, it will be seen that the alternative construction shown in Figs. 6–8 constitutes a compounding of the unit of the invention shown in Figs. 1–5.

Figure 9:
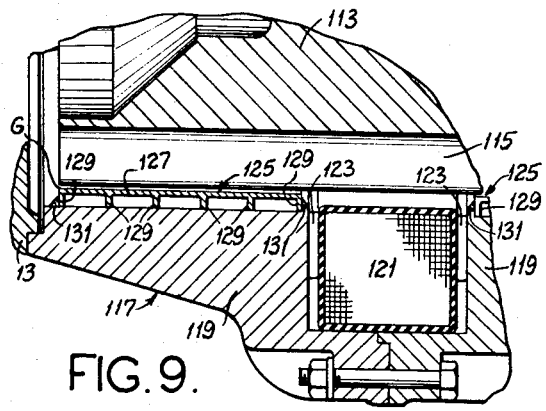
Figs. 9, 10 and 11 are fragmentary axial sections showing modifications of certain parts of the invention.

In Fig. 9 is shown an alternative form of inductor and water-cooling ring applied to the form of the invention shown in Figs. 1–5. In this case the drive shaft is not shown and only significant parts of the rotor and stator. The rotor is numbered 113, having polarizing teeth 115. The stator is indicated at 117 and is constituted by two ferromagnetic members 119, embracing and supporting the coil 121 on spacing pads 123 so as to provide for water circulation around the coil. The latter arrangement may also be employed in the forms of the invention shown in Figs. 1–8. One of the four inductor and water-circulating liners is indicated at 125. Each is made of ductile material such as forged steel or copper and is constituted by an inner sleeve 127, having outer collars or ribs 129 and being welded at the ends to the respective members 119, as indicated at 131. The ribs 129 may be brazed to the adjacent members 119. Suitable porting is provided for water circulation through the spaces provided between the members 119, 127 and 129 and around the coil 121. The cross sections of parts 127, 129, 131 are again so small that the amount of flux transmitted far exceeds that for saturation, so that it must jump the water-filled gap between sleeve 127 and stator part 119.

As will be apparent from Fig. 9, the ductile and flexible member 125 is constituted by a single piece. It may be made up of several flanged rings, as illustrated in Fig. 10, wherein like numerals designate like parts in Fig. 9.

Figure 10:
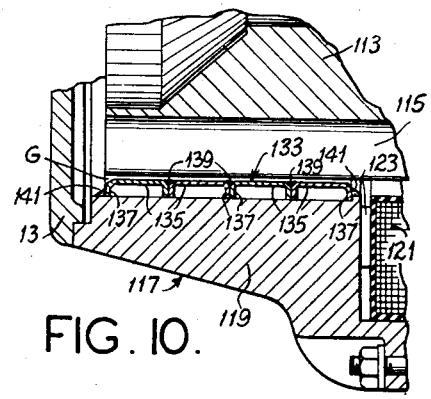

In Fig. 10 the inductor and water-circulating member is indicated in general at 133 and is composed of a plurality of thin-walled ductile forged rings 135 having outwardly directed collars or ribs 137 adjacent ones of which are brazed together as indicated at 139, and the end ones of which are welded to the member 119, as indicated at 141. Also, the adjacently paired ribs may be brazed to the member 119. And again the large imposed flux field exceeds that required to saturate member 133, so that the flux jumps the water-filled ring gaps between 133 and 119.

Figure 11:
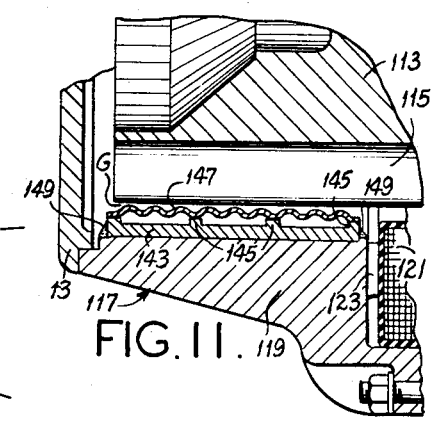

In Fig. 11 is shown another form of the invention in which like numerals designate like parts on Figs. 9 and 10. In this case there is a relatively thick steel sleeve 143, having inwardly directed thin collars or ribs 145 to which is brazed a thin peripherally corrugated inner sleeve 147. Sleeve 147 is composed of ductile forged steel or copper. The corrugations increase the flexibility of the member 147. The assembly of members 143 and 147 is fitted into the member 119 and welded, as shown at 149. Again the large imposed flux field is required to jump the gap constituted by the water passages.

In each of the forms of the invention as shown in Figs. 9, 10 and 11, suitable water inlets, outlets and transfer boxes are provided for water circulation, further description of which will not be necessary in view of what has been said in connection with water circulation of the forms of the invention shown in Figs. 1–5. Similar means are used in the Figs. 9–11 cases.

Figure 12:
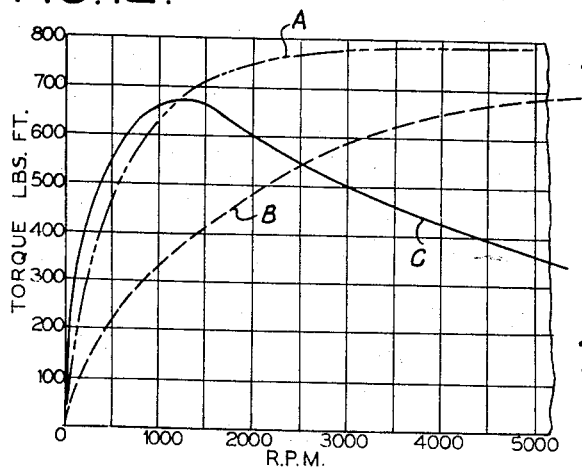
Fig. 12 is a graph illustrating certain operating functions.

Fig. 12 is a graph illustrating by curve A a typical torque-speed curve of comparative former machines which do not employ the new features of the present invention. This curve is characterized by a rapid rise in torque in the relatively low-speed range in which the former machines are operative. On the other hand, curve B, illustrative of the results obtained by machines made according to the present invention, wherein the inner thin forged sleeves are composed of steel, shows a less rapid rise of torque at the lower speeds. However, at higher speeds this curve B approaches the higher torques of curve A. If curve B is extrapolated to the right, it will rise to the higher torque values of curve A in the higher speed ranges such as 15,000 r.p.m. and up. It must be understood, however, that curve A could not be extrapolated to the right, because the older machines cannot be made to remain safely operative in the higher speed ranges. In short, the construction made according to the present invention with steel inner sleeves provides for safe continuous very high-speed operation at very high torque capacities.

Curve C in Fig. 12 illustrates typical results obtained by making the inner thin flexible water-carrying rings of ductile copper. Copper is an excellent heat conductor, some six times better than steel, but it has a lower electrical resistance which brings about large countermagnetic suppressing forces at high velocities, which accounts for the dropping characteristic of curve C. Thus this copper ring form of the invention is to be selected when the amount of energy to be absorbed at the high speeds is smaller.

An important feature of the present invention is the thinness of the sleeve forming the water passages closely adjacent the outer ends of the polarizing teeth on the rotor. This applies to all forms of the invention shown and minimizes the temperature gradient through the sleeve. It also, taken with the flexibility of the rib supports, relieves any temperature-induced stresses without leakage and cracking.

Another feature connected with the thinness of the sleeves and the ribs connecting them with the heavier parts of the stator, such as shown in Figs. 9 and 10, or with the heavier rings lining the stator, such as shown in Figs. 1 and 11 is that the large flux field rapidly saturates them, and that the part of this field not accommodated must pass through gaps formed by the water passages. However, while the ribs, unlike those in the prior art, are not designed to accept all of the flux field available from the exciting coil, they provide a more flexible axial mount for the thin innner sleeves. Thus it is to be emphasized that the ampere turns of the exciting coil are made sufficient to drive any flux that cannot be accommodated by the thin flexible radial ribs supporting the thin flexible inner sleeve directly across the water-filled gap behind the inner thin flexible sleeve. The required larger coil and current therefor, as well as the heavy stator required to support the larger coil, are not disadvantageous from the viewpoint of strength and safety because the stator is not rotating and therefore not subject to increased dynamometer stresses due to increased weight. Thus while additional weight is thrown into the stator by reason of the larger coil requirements, because an insufficient ferromagnetic path is provided for by the inner water-containing sleeves and their radial supporting ribs, the net result is the ability to absorb more heat at higher speeds with a rotor of smaller and safer diameter.

While the above description relates to dynamometers particularly, it will be understood that the invention is applicable to analogous apparatus such as brakes and similar eddy-current couplings. These will be referred to in the claims by the generic term eddy-current brake.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An eddy-current brake comprising a magnetizable stator formed with an inside cylindrical face, a magnetizable rotor within the stator formed with peripheral polarizing teeth, the ends of which teeth are circularly disposed at a substantial distance from said face, an annular field coil located around the center line of the rotor, said coil adapted when excited to produce a toroidal flux field interlinking the rotor and the stator, circular sleeve-forming means located between the stator and the rotor, said means having inner surfaces which are circularly uninterrupted and located at a relatively small distance from the ends of said teeth to provide therewith a relatively small magnetic gap, said sleeve means also having circularly uninterrupted opposite surfaces located at relatively large distances inward from said inside cylindrical face of the stator to provide therebetween a relatively large peripherally unobstructed magnetic gap, radially disposed collars adapted to support said sleeve means inward from said inner cylindrical face of the stator, and means adapted to circulate coolant peripherally between the sleeve means and said face in said circularly unobstructed and relatively large magnetic gap, the intensity of said flux field established by said field coil being sufficiently high that passage of all of it cannot be accommodated by said collars, and a substantial amount of said flux being forced to traverse the relatively small gap, the sleeve means and the coolant-filled relatively large magnetic gap located between the sleeve means and said cylindrical face, whereby substantial eddy currents are engendered both in the sleeve means and in the cylindrical face of the stator due to relative movements of the polarized parts of the field emanating from said teeth.

2. An eddy-current brake according to claim 1, wherein said sleeve means is constituted by thin material as compared to the radial thickness of the stator.

3. An eddy-current brake according to claim 2, wherein said sleeve means is magnetizable.

4. An eddy-current brake according to claim 2, wherein said sleeve means is electrically conductive but non-magnetic.

5. An eddy-current brake according to claim 2, wherein said flexible material is axially corrugated in a direction adapted to preserve the peripherally uninterrupted character of said sleeve means.

6. An eddy-current brake according to claim 2, wherein said collars are integral with said sleeve means.

7. An eddy-current brake according to claim 2, wherein said collars are integral with the inner face-forming portions of the stator.

References Cited in the file of this patent

UNITED STATES PATENTS

| 2,367,163 | Winther | Jan. 9, 1945 |
| 2,386,701 | Martin | Oct. 9, 1945 |
| 2,417,686 | Hugin | Mar. 8, 1947 |

FOREIGN PATENTS

| 241,029 | Switzerland | June 17, 1946 |